United States Patent [19]

Lund

[11] Patent Number: 4,580,843
[45] Date of Patent: Apr. 8, 1986

[54] BALE RACK

[76] Inventor: Trueman F. Lund, P.O. Box 153, Boyle, Alberta, Canada, T0A 0M0

[21] Appl. No.: 565,468

[22] Filed: Dec. 27, 1983

[30] Foreign Application Priority Data

Jun. 20, 1983 [CA] Canada ................................. 430748

[51] Int. Cl.$^4$ .............................................. B60P 1/16
[52] U.S. Cl. ...................................... 298/18; 105/239; 211/59.4; 280/796; 280/798; 280/180; 296/6; 296/184; 298/10; 298/38; 298/1 R; 410/42; 414/24.5; 414/719; 414/58; 414/480
[58] Field of Search ....................... 414/24.5, 24.6, 29, 414/30, 58, 470, 480, 719; 298/38, 1 R, 10, 8 R, 18, 19, 17 R; 296/3, 68, 184; 105/239, 355; 211/49 S; 280/798, 796, 180; 410/36, 37, 42, 31, 32

[56] References Cited

U.S. PATENT DOCUMENTS

| 1,090,338 | 3/1914 | Payer | 298/18 |
|---|---|---|---|
| 1,141,112 | 6/1915 | Ewing | 296/6 |
| 1,891,458 | 12/1932 | Stark | 298/18 X |
| 3,021,970 | 2/1962 | Bigge et al. | 410/37 X |
| 3,922,036 | 11/1975 | Kalsbeck et al. | 414/24.5 X |
| 4,068,772 | 1/1978 | Prudhomme | 414/480 |
| 4,092,050 | 5/1978 | Sobeck | 298/18 |
| 4,138,159 | 2/1979 | Hall | 298/18 |
| 4,459,075 | 7/1984 | Eichenberger | 414/24.5 |

FOREIGN PATENT DOCUMENTS

| 262633 | 9/1964 | Australia | 296/3 |
|---|---|---|---|
| 972923 | 2/1951 | France | 298/38 |
| 763164 | 9/1980 | U.S.S.R. | 410/32 |

Primary Examiner—Frank E. Werner
Attorney, Agent, or Firm—Lerner, David, Littenberg, Krumholz & Mentlik

[57] ABSTRACT

A bale rack comprises an elongate horizontal frame mounted on wheels for movement along the ground, and a pair of bale supports extending along opposite sides of the frame. The bale supports are pivotable relative to the frame between a raised position, in which the bale supports serve to retain bales on the frame, and a load release position, in which the bale supports are downwardly and laterally inclined from the frame to allow a bale to roll from the frame to the ground. Latch mechanisms are provided for releasably retaining the bale supports in the raised positions, and counterweights are provided for urging the bale supports from the lowered positions to the raised positions, thus avoiding the use of springs, hydraulic devices or other relatively complicated mechanisms for this purpose.

5 Claims, 7 Drawing Figures

FIG. 1
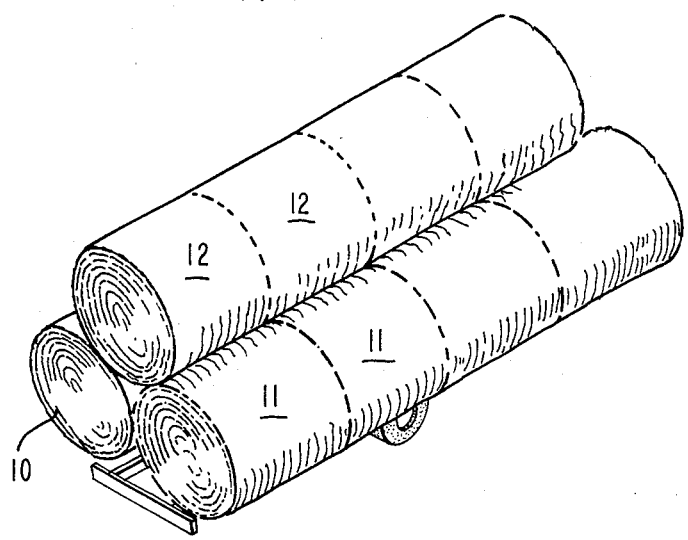
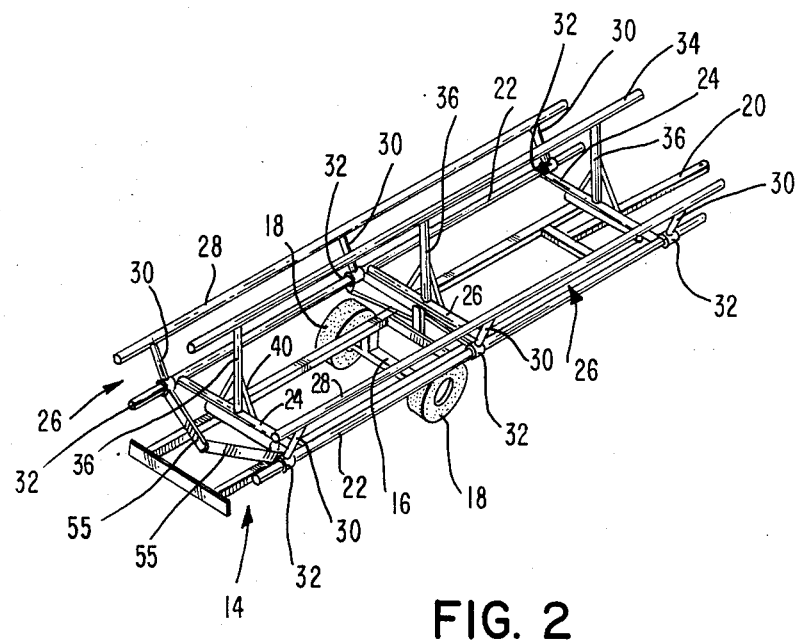
FIG. 2

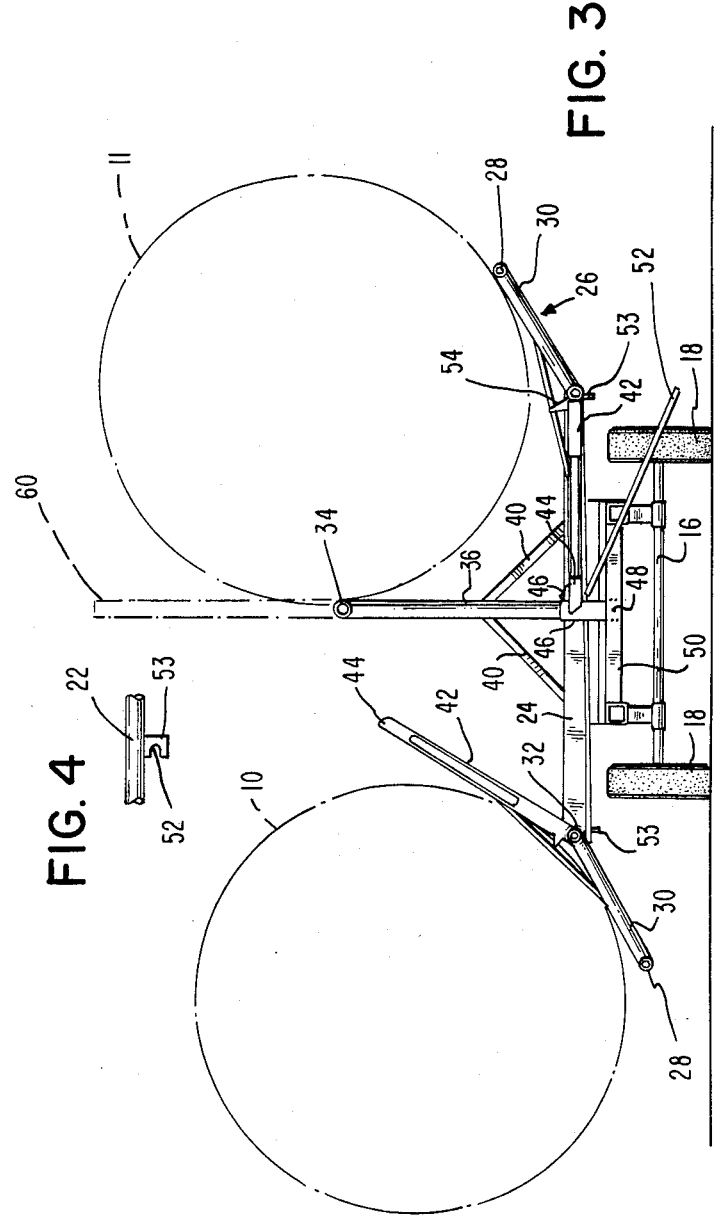

4,580,843

BALE RACK

BACKGROUND OF THE INVENTION

The present invention relates to a bale rack for use, for example, in transporting bales from fields to storage positions.

In the past, various types of bale transporters have been employed for picking up bales from a field for transportation to a storage site. However, the prior art bale transporters have had the disadvantage that they are relatively complicated and, consequently, relatively expensive and subject to mechanical failures.

It is accordingly an object of the present invention to provide a novel and improved bale rack for transporting bales which is of simple and inexpensive construction.

SUMMARY OF THE PRESENT INVENTION

According to the present invention, there is provided a bale rack comprising an elongate horizontal frame; means for supporting the frame for movement along the ground; a pair of bale support means at opposite sides of the frame; means for pivotably connecting each of the bale support means to the opposite sides of the frame and permitting pivotation of the bale support means relative to the frame between a raised support position for retaining a bale on the frame and a lowered release position in which the bale support means is downwardly inclined to allow a bale to roll from the frame to the ground; latch means for releasably retaining the bale support means in the raised positions; and counterweight means for urging the bale support means from the lowered positions to the raised positions.

By using counterweight means for restoring the bale support means from the lowered positions to the raised positions, complicated and/or expensive devices such as hydraulic pistons and cylinders and mechanical drive linkages for this purpose are avoided.

In a preferred embodiment of the invention, the bale support means comprise a pair of bale support rails extending longitudinally on the frame and retained in parallel space relationship with the sides of the frame, and an additional intermediate rail is provided parallel to and between the bale support rails so that one or more pairs of bales can be carried side-by-side on the rack, with a third bale supported on and between the or each pair of bales.

BRIEF DESCRIPTION OF THE DRAWINGS

The invention will be more readily understood from the following description of a preferred embodiment thereof illustrated, by way of example, in the accompanying drawings, in which:

FIG. 1 shows a view in perspective of a loaded bale rack embodying the present invention;

FIG. 2 shows a view in perspective of the bale rack of FIG. 1 but with the bales omitted to reveal details of the bale rack;

FIG. 3 shows a view taken in transverse cross-section through the bale rack of FIGS. 1 and 2;

FIG. 4 shows a side view of a catch;

DESCRIPTION OF A PREFERRED EMBODIMENT

Figure 5:
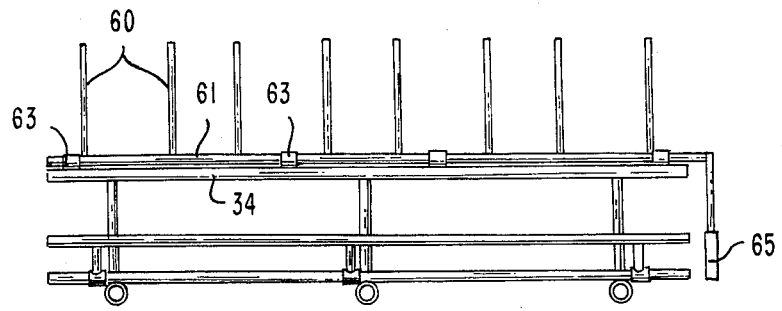
FIG. 5 shows a side view of a modification of parts of the rack of FIG. 1.

The bale racks illustrated in the accompanying drawings are intended for carrying bales of hay with the bales arranged longitudinally of each rack in sets of three, each set of bales comprising a lowermost pair of bales 10 and 11, and a third bale 12 supported in and between the lowermost pair 10 and 11, as shown in FIG. 1.

FIG. 2 shows a bale rack which comprises a chassis, indicated generally by reference numeral 14, which is provided approximately midway along its length with an axle 16 mounting a pair of wheels 18 for supporting the rack on the ground. A towbar 20 projects forwardly from the front end of the chassis for use in securing the rack as a trailer behind a tractor or any other suitable prime mover.

On the chassis 14 there is mounted an elongate rack frame comprising a pair of parallel, longitudinally extending side bars 22, which are interconnected by three transverse bars 24 secured to the side bars 22 by welding or by any other suitable connections.

A pair of bale supports, indicated generally by reference numeral 26, extend upwardly and laterally outwardly from respective ones of the side bars 22.

The bale supports 26 each comprise a bale support rail or bar 28 extending longitudinally of the rack, i.e. parallel to the side bars 22 of the rack frame, and arms 30 which, at their outermost ends, are fixedly secured to the support bars 28 by welding or by any other suitable connections.

The innermost ends of the arms 30 are fixedly secured to sleeves 32, which are provided on the side bars 22 and which are free to rotate about the side bars 22. In this way, the bale supports 26 are pivotally connected to the side bars 22.

More particularly, as illustrated in FIG. 3, the bale supports 26 are each pivotable between a raised position, in which the right-hand bale support 26 is shown in FIG. 3, and a lowered position, in which the left-hand bale support 26 is shown in FIG. 3.

A third, intermediate bar 34 extends longitudinally of the rack, i.e. parallel to the bale support bars 28, above the longitudinal centre of the chassis 14 and above the level of the bale support bars 28 when the latter are in their raised positions. The intermediate bar 34 is supported on three posts 36 upstanding from the rack transverse bars 24 and connected by welding or any other suitable connections to the intermediate rail 34 and the rack transverse bars 24. For reinforcing the posts 36, struts 40 are connected between the posts 36 and the rack transverse bars 24, as shown in FIGS. 2 and 3.

Each of the bale supports 26 is provided with a latch bar 42 extending inwardly of the rack from one of the sleeves 32 and having a free end 44 engageable in a latch member 46. Each latch member 46 is pivotally secured, by means of a pivot pin 48, to a cross-bar 50 forming part of the chassis 14.

Each latch member 46 is provided with a release handle 52 projecting to the opposite side of the frame from the respective latch bar 42 and releasably retainable in a catch 53 (FIGS. 3 and 4) secured by welding to the underside of the respective frame side bar 22. In its raised position, each bale support 26 is releasably retained by interengagement of the free end 44 of its latch bar 42 in a recess formed in the corresponding latch member 46 which, in turn, is retained in position by engagement of its release handle 52 in its catch 53.

In its raised position, each bale support 26 supports an overlying bale, for example, the bale 11 shown in broken lines in FIG. 3, between the relevant bale support 26 and the intermediate rail 34.

As will be readily apparent from FIG. 1, a pair of bales 10 and 11 supported side-by-side in this manner by the bale supports 26 can, in turn, support the third bale 12.

When it is desired to deposit the bales from the bale rack onto the ground, the release handles 52 are manually released from their catches 53 so as to allow pivotation of the latch members 46 about their pivot pins and, thus, so as to release the free ends of the latch bars 42. The bale supports 26 are then free to pivot about their respective frame side bars 22 from their raised positions to their lowered positions, so as to allow the bales to roll down the now downwardly and laterally outwardly inclined bale supports 26 onto the ground, as illustrated by the bale 10, shown in broken lines in FIG. 3.

The bale supports 26 are each provided with a plurality of projections in the form of fingers 54 projecting upwardly and inwardly from the frame side bars 22 when the bale supports 26 are in their raised positions. Upon release of the bale supports 26, in the above-described manner, the fingers 54 engage the bales and ensure that the bales are displaced laterally from the rack as the bale supports 26 pivot downwardly, under the weight of the bales, from their raised positions to their lowered positions.

For restoring the bale supports 26 from their lowered positions to their raised positions when the bales have been discharged from the rack in the above-described manner, counterweight arms 55 (FIG. 2) are secured to the sleeves 32 of the bale supports 26 at the sides of the frame side bars 22 opposite from respective ones of the bale supports 26.

Figure 6:
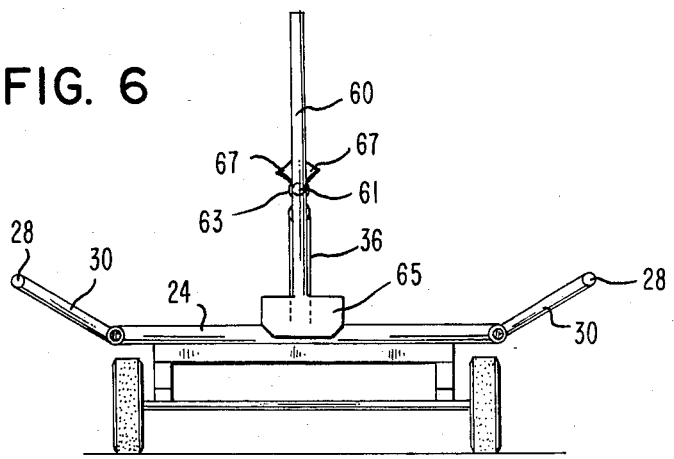
FIG. 6 shows an end view of the modified parts of FIG. 5.

In a modification of the above-described mechanism, guide bars 60, shown in dash-dot lines in FIG. 3, are pivotally secured above the intermediate rail 34 so as to extend, at an inclination to the vertical, between one of the lowermost bales 10 and 11 and the uppermost, third bale 12. More particularly, as shown in greater detail in FIGS. 5 and 6, in this modification the guide bars 60 are fixed, by welding, at their lower ends to a horizontal rail 61 which extends above and parallel to the intermediate rail 34 and is pivotable about its longitudinal axis in sleeves 63 secured by welding to the rail 34. A counterweight 65 suspended from one end of the rail 61 tends to restore the guide bars 60 to their vertical position, shown in FIG. 3.

Each guide bar 60 is provided, at each side thereof, with an abutment 67 for engagement with the rail 34 to limit the extent to which the guide bars can be pivoted downwardly about the axis of the rail 61, so that when the abutments 67 engage the rail 34, the guide bars project downwardly and laterally from the intermediate bar 34 at an angle such as to discharge the third bales 12, which roll along the guide bars 60, at a sufficiently high level to enable the third bales 12 to be deposited on and between previously deposited pairs of bales, so that bales can be deposited on the ground in sets of three, each set comprising a pair of parallel, adjacent bales resting on the ground and a third bale resting on and between the adjacent pair of bales.

Instead of being provided as a trailer, the bale rack may be mounted on the chassis of a truck or any other suitable vehicle.

Figure 7:
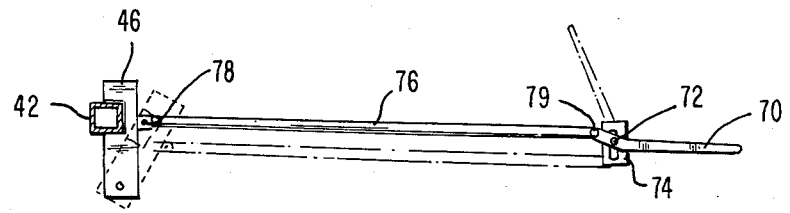
FIG. 7 shows a side view of a modified bale support latch mechanism.

In a further modification, illustrated in FIG. 7, each latch member 46 is rearranged so as to engage its respective latch bar 42 laterally of the latter. A handle 70 in the form of a double-armed lever is pivotally supported by a pivot pin 72 on a bracket 74 or the like at the front end of the bale rack or within a driving cab of a vehicle on which the rack is mounted.

A link 76 is pivotally connected by pivot pins 78 and 79 to the latch member 46 and the handle 70, respectively. By rotating the handle 70 about the pin 72, the latch member 46 can be pivoted from an engaged position shown in full lines in FIG. 7 to a disengaged position shown in dash-dot lines.

As will be readily apparent to those skilled in the art, further modifications and improvements may be made in the above-described apparatus within the scope of the appended claims.

I claim:

1. A bale rack, comprising:

an elongate horizontal frame;

means for supporting said frame for movement along the ground;

a pair of bale support means at opposite longitudinal sides of said frame for supporting first and second bales having longitudinal axes side-by-side on said bale support means, and a third bale on said first and second bales having its longitudinal axis parallel to the said longitudinal sides;

means for pivotally connecting each of said bale support means to said opposite sides of said frame and permitting pivotation of said bale support means relative to said frame between a raised support position for retaining said bales on said frame and a lowered release position in which said bale support means are downwardly inclined to allow said bales to roll from said frame to the ground;

latch means for releasably retaining said bale support means in the raised positions;

counterweight means for urging said bale support means from the lowered positions to the raised positions;

bale retaining means extending substantially vertically upwardly on said frame between said first and second bales for retaining said first and second bales on respective ones of said bale support means;

bale guide means for guiding said third bale from said bale rack;

pivot means for supporting said bale guide means on said bale retaining means for pivotation between an upper position, in which said bale guide means extends between said third bale and an underlying one of said first and second bales, and a lower position, in which said bale guide means are downwardly inclined towards one side of said bale rack; and stop means for supporting said bale guide means in said lower position at a height and an inclination such that said third bale can roll down said bale guide means onto a pair of bales previously deposited side-by-side on the ground after an underlying one of said first and second bales is deposited on the ground.

2. A bale rack as claimed in claim 1, wherein said bale retaining means extend longitudinally of said bale rack and said bale guide means are mounted for pivotation relative to said bale retaining means in a direction transverse to the longitudinal direction of said bale rack.

3. A bale rack as claimed in claim 2, wherein said bale retaining means comprise a first rail extending along and above said frame, said bale guide means comprising a second rail parallel to said first rail and pivotally supported on said first rail by said pivot means, a plurality of bars each secured at one end thereof to said second rail, and counterweight means connected to said second rail for biasing said second rail towards a position of pivotation in which said bars project upwardly therefrom.

4. A bale rack as claimed in claim 1, further comprising counterweight means for uring said bale guide means towards an uppermost position thereof.

5. A bale rack as claimed in claim 1, further comprising a plurality of fingers projecting from said bale support means for engaging said first and second bales.

* * * * *

UNITED STATES PATENT AND TRADEMARK OFFICE
CERTIFICATE OF CORRECTION

PATENT NO. : 4,580,843

DATED : April 8, 1986

INVENTOR(S) : Lund

It is certified that error appears in the above-identified patent and that said Letters Patent is hereby corrected as shown below:

Column 6, line 4, delete "uring" and substitute therefor --urging--.

Signed and Sealed this

Fifteenth Day of July 1986

[SEAL]

Attest:

Attesting Officer

DONALD J. QUIGG

Commissioner of Patents and Trademarks